(12) United States Patent
Moon et al.

(10) Patent No.: US 10,046,290 B2
(45) Date of Patent: Aug. 14, 2018

(54) SHELL-AND-MULTI-TRIPLE CONCENTRIC-TUBE REACTOR AND HEAT EXCHANGER

(71) Applicant: KOREA INSTITUTE OF SCIENCE AND TECHNOLOGY, Seoul (KR)

(72) Inventors: Dong Ju Moon, Seoul (KR); Gi Hoon Hong, Seoul (KR); Jae Suk Lee, Seoul (KR); Jae Sun Jung, Seoul (KR); Eun Hyeok Yang, Seoul (KR); Sung Soo Lim, Seoul (KR); Young Su Noh, Seoul (KR); Ji In Park, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 15 days.

(21) Appl. No.: 15/203,420

(22) Filed: Jul. 6, 2016

(65) Prior Publication Data

US 2017/0274339 A1    Sep. 28, 2017

(30) Foreign Application Priority Data

Mar. 24, 2016    (KR) .......................... 10-2016-0035110

(51) Int. Cl.
*B01J 8/06*        (2006.01)
*F28D 7/10*        (2006.01)
*B01J 8/22*        (2006.01)

(52) U.S. Cl.
CPC ............... *B01J 8/067* (2013.01); *B01J 8/065* (2013.01); *B01J 8/22* (2013.01); *F28D 7/103* (2013.01);

(Continued)

(58) Field of Classification Search
CPC . B01J 8/067; B01J 8/087; B01J 8/1836; B01J 19/244; B01J 2208/00185; B01J 2208/00194; B01J 2208/00212; B01J 2208/00221; F28D 7/103; F28D 7/106; F28D 7/12; F28D 27/103; F28D 27/106; F28D 27/12

See application file for complete search history.

(56) References Cited

U.S. PATENT DOCUMENTS 1,826,548 A * 10/1931 Jaeger .................... B01J 8/0285
                                                          422/202
2,475,025 A *  7/1949 Huff ......................... B01J 8/008
                                                          165/140

(Continued)

FOREIGN PATENT DOCUMENTS

JP      2005-274109 A    10/2005
JP      2012-149871 A     8/2012

(Continued)

*Primary Examiner* — Lessanework Seifu
(74) *Attorney, Agent, or Firm* — Goldilocks Zone IP Law

(57) ABSTRACT

The present disclosure relates to a shell-and-multi-triple concentric-tube reactor and a shell-and-multi-triple concentric-tube heat exchanger, and to a shell-and-multi-triple concentric-tube reactor and a shell-and-multi-triple concentric-tube heat exchanger which provide a new type of reactor and heat exchanger, thereby maximizing catalyst performance and improving performance of the reactor by optimizing heat exchange efficiency and a heat flow, uniformly distributing a reactant, and increasing a flow rate of the reactant, and accordingly making the reactor and the heat exchanger compact.

15 Claims, 8 Drawing Sheets

(52) U.S. Cl.
CPC ............. *B01J 2208/00132* (2013.01); *B01J 2208/00221* (2013.01)

(56) References Cited

U.S. PATENT DOCUMENTS

| | | | |
|---|---|---|---|
| 3,557,760 A * | 1/1971 | Romanos | F22B 1/063 122/32 |
| 3,963,071 A * | 6/1976 | Levin | F23D 11/44 165/104.19 |
| 2005/0150640 A1 | 7/2005 | Nadig | |
| 2005/0188619 A1 | 9/2005 | Rostrup-Nielsen et al. | |
| 2009/0170964 A1 * | 7/2009 | Fayyaz Najafi | B01J 8/009 518/700 |
| 2010/0260651 A1 | 10/2010 | Lehr et al. | |
| 2010/0307726 A1 | 12/2010 | Chiu et al. | |

FOREIGN PATENT DOCUMENTS

| | | |
|---|---|---|
| JP | 5743051 B2 | 7/2015 |
| KR | 10-0847199 B1 | 7/2008 |
| KR | 10-0898692 B1 | 5/2009 |

\* cited by examiner

SHELL-AND-MULTI-TRIPLE CONCENTRIC-TUBE REACTOR AND HEAT EXCHANGER

CROSS-REFERENCE TO RELATED APPLICATION

This application claims under 35 U.S.C. § 119 a the benefit of Korean Patent Application No. 10-2016-0035110 filed on Mar. 24, 2016, the entire contents of which are incorporated herein by reference.

BACKGROUND (a) Technical Field

The present disclosure relates to a shell-and-multi-triple concentric-tube reactor and a shell-and-multi-triple concentric-tube heat exchanger. More particularly, it relates to a compact shell-and-multi-triple concentric-tube reactor and a compact shell-and-multi-triple concentric-tube heat exchanger which are capable of efficiently obtaining a desired product through a catalytic reaction of a reactant by supplying a heating medium and the reactant, and capable of effectively controlling a reaction through a heat exchange between the reactant or a heat exchange target material and the heating medium.

(b) Background Art

In general, a shell-and-tube multitubular reactor and a shell-and-tube multitubular heat exchanger (hereinafter, referred to as a shell-and-tube reactor and a shell-and-tube heat exchanger) are a compact reactor and a compact heat exchanger which have a reactor and heat exchanger structure in which a shell side at which a heat exchange material is supplied is coupled to a bundle of multiple tubes formed by installing a plurality of tubes filled with reactant gas and a catalyst, and are very effective in performing catalytic reactions such as chemical reactions which generate heat or absorb a large amount of heat, particularly, a synthetic fuel producing reaction and a hydrocarbon reforming reaction.

In particular, since the shell-and-tube reactor and the shell-and-tube heat exchanger have a structure in which a bundle of tubes, which has a smaller diameter than that of the existing single-tube fixed-bed reactor and the existing single-tube heat exchanger, is applied to smoothly exchange materials and heat and maximize performance of the catalyst, the shell-and-tube reactor and the shell-and-tube heat exchanger are evaluated as being effective for a GTL (gas to liquid) process which produces synthetic petroleum from natural gas, a GTL-FPSO process which is applicable to a marine environment, a petrochemical process, a fine chemical process, and an energy environment process.

For example, because a Fischer-Tropsch synthesis reaction, which is a key reaction of the GTL process which produces synthetic petroleum from natural gas, generates a large amount of heat, and thus a smooth heat exchange is required between a catalyst layer and a heating medium in order to prevent a hot spot, the Fischer-Tropsch synthesis reaction is greatly affected by a shape of a reactor as well as a reaction condition.

In the case of the aforementioned shell-and-tube reactor, a plurality of reaction tubes is filled with a catalyst, reactant gas is supplied through inlet ports of the reaction tubes, a product and unreacted gas are discharged through discharge ports, and a heating medium circulates through a shell side so that a chemical reaction may occur under a heat exchange condition optimized by being controlled.

The reactor is useful as the Fischer-Tropsch reactor that produces liquid phase synthetic fuel by using synthetic gas made by reforming natural gas as briefly mentioned above, and the Fischer-Tropsch synthesis reaction produces long chain hydrocarbon synthetic fuel through a hydrocarbon chain propagation reaction using synthetic gas including hydrogen and carbon monoxide obtained by reforming natural gas by using reactant gas.

The Fischer-Tropsch synthesis reaction is a reaction which generates a large amount of heat when synthesizing synthetic fuel, and thus it is very important to smoothly perform a heat exchange in the reactor by designing an optimal reactor as well as a reaction condition.

In the case of the GTL-FPSO process which targets a limit gas field on the sea and associated gas by applying the GTL process to a marine environment, the entire process needs to be applied to a limited space on a ship, and as a result, a compact GTL technology in which a volume thereof is greatly reduced compared to the existing GTL process is required in consideration of the limitation to a size, a height, and a weight of an apparatus or the like, and particularly, there is an acute need for development of a GTL-FPSO technology which utilizes the compact GTL technology.

A structure of a typical shell-and-tube reactor is configured such that multitubular catalytic reaction flow paths, which are used as unit reactors and filled with a catalyst, are installed, and for example, in the case of a synthetic fuel synthetic reaction, the structure of the shell-and-tube reactor is configured such that a flow of synthetic gas for a synthetic reaction and a flow of a heating medium fluid are not mixed together, and as a result, heat of the heating medium is effectively transferred to respective unit reactors, such that reaction heat of the catalytic reaction is effectively controlled, overall operational efficiency of the reactor is improved, and the operation is easily carried out, and thus the shell-and-tube reactor is advantageous in terms of scale-up of the reaction process as well as the operation of the reaction process.

FIG. 1 illustrates a cross-sectional view of a typical shell-and-tube reactor. The shell- and tube reactor includes a catalytic reaction flow path through which a reactant flows in at an upper side of the reactor and flows out at a lower side of the reactor, and includes a separate inlet port and a separate discharge port such that a heating medium flows on a shell inner surface, thereby performing a heat exchange between heating media which flow at an outer side of the catalytic reaction flow path and on the shell inner surface.

In consideration of the aforementioned important point of the reactor and the heat exchanger, presently, research of a reactor, which continuously includes regions for a reaction and regions for controlling (cooling/heating) a temperature between a plurality of stages in the shell-and-tube reactor having the plurality of stages and a plurality of tubes, is being conducted.

As a related art, U.S. patent application Ser. No. 12/481,107 (hereinafter, referred to as Literature 1) discloses a shell-and-tube reactor having a plurality of stages, and includes a bundle of regions in which reactant gas flow regions and coolant flow regions are separated from each other in a longitudinal direction.

As another related art, U.S. Patent Application Publication No. 2010/260,651 (hereinafter, referred to as Literature 2) discloses a reactor including a cooling system which improves cooling efficiency by applying a double type tube, which has a vertically protruding and sealed end, to a shell type reactor including a cooling system.

However, a hot spot and a cold spot are present during a reaction which generates a large amount of heat and absorbs a large amount of heat even in the shell-and-tube reactor and the shell-and-tube heat exchanger for typical cooling/heating, and in this case, a shape of a reactor, which may improve heat exchange performance of the catalyst that causes a reaction, is important.

Therefore, in order to control a change in temperature due to an exothermic reaction and an endothermic reaction which occur in the catalytic reaction flow path, a shape of a reactor, which maximizes heat exchange performance by adding a shell side heating medium, allowing the heating medium to additionally flow into the catalytic reaction flow path, and performing a heat exchange inside and outside the catalytic reaction flow path, is required.

That is, there is a need for a configuration, which minimizes a difference in temperature between the reactant gas and the heat exchange target material between an inner partition wall and a central portion of the reaction flow path by minimizing a difference in temperature between the hot spot and the cold spot of the reactant gas and the heat exchange target material and by maximizing heat exchange performance.

However, Literatures 1 and 2 do not disclose a separate configuration for improving a difference in temperature between the reactant gas and the heat exchange target material, which are generated in the reaction flow path.

Therefore, the present patent is intended to present a shell-and-multi-triple concentric-tube reactor and a shell-and-multi-triple concentric-tube heat exchanger which maximize heat exchange performance of the shell-and-tube reactor and the shell-and-tube heat exchanger.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art, and to provide a shell-and-multi-triple concentric-tube reactor and a shell-and-multi-triple concentric-tube heat exchanger which are capable of improving performance of a catalyst required for a reaction, and maximizing heat exchange efficiency to prevent a hot spot and a cold spot which are generated by an exothermic reaction and an endothermic reaction.

The present invention has also been made in an effort to provide a technology of improving heat transfer characteristics and heat exchange performance at a central portion of a reaction flow path, by including inner heating medium inlet tubes in order to minimize a difference in temperature between a hot spot and a cold spot of a shell-and-multi-triple concentric-tube reactor and a shell-and-multi-triple concentric-tube heat exchanger.

The present invention has also been made in an effort to provide a shell-and-multi-triple concentric-tube reactor and a shell-and-multi-triple concentric-tube heat exchanger which are capable of uniformly distributing a reactant, increasing a flow rate of the reactant, maximizing catalyst performance, improving efficiency of the reactor, and making the reactor and the heat exchanger compact.

The present invention has also been made in an effort to provide a shell-and-multi-triple concentric-tube reactor and a shell-and-multi-triple concentric-tube heat exchanger which are capable of being applied to various reactions by providing various heat exchange manners in the reactor by using various heat exchange media in accordance with the type of reactions.

The objects of the present invention are not limited to the aforementioned objects, and the other objects of the present invention, which are not mentioned above, may be clearly understood from the following descriptions and may become apparent from the exemplary embodiments of the present invention. In addition, the objects of the present invention may be implemented by means and a combination thereof disclosed in the claims.

In one aspect, the present invention provides a shell-and-multi-triple concentric-tube reactor including: a shell side heating medium flow zone in which a shell side heating medium flows along a route formed by a baffle in a shell; a catalytic reaction zone in which a reactant is distributed to respective catalytic reaction flow paths by a reactant distributing unit, and the reactant performs a catalytic reaction with a catalyst positioned in the catalytic reaction flow paths, the catalytic reaction zone including a product capturing unit which captures a product produced by a heat exchange between the shell side heating medium and an inner heating medium and an unreacted material which is not reacted; and an inner heating medium flow zone in which the inner heating medium is distributed to inner heating medium inlet tubes inserted into the catalytic reaction flow paths by an inner heating medium distributing unit, and the inner heating medium, which exchanges heat with the catalytic reaction flow path, is discharged to an inner heating medium capturing unit through inner heating medium discharge tubes, in which one end of the inner heating medium inlet tube inserted into the catalytic reaction flow path is configured to be closed, the inner heating medium discharge tube includes a configuration that is inserted into the inner heating medium inlet tube and opened, such that the inner heating medium flowing into the inner heating medium inlet tube is discharged through the inner heating medium discharge tube, the shell side heating medium flow zone and the catalytic reaction zone are separated by a first sealing barrier through which the catalytic reaction flow paths pass, the reactant distributing unit and the inner heating medium flow zone are separated by a lower second sealing barrier through which the inner heating medium inlet tubes pass so that the inner heating medium and the reactant are not in contact with each other, and the inner heating medium distributing unit and the inner heating medium capturing unit are separated by an uppermost second sealing barrier.

In a preferred embodiment, in the shell side heating medium flow zone, the shell side heating medium may be supplied to a shell side heating medium supply port, may pass through a shell side heating medium flow path, and may exchange heat with the catalytic reaction flow path, and then the shell side heating medium may be discharged through a shell side heating medium discharge port.

In another preferred embodiment, in the catalytic reaction zone, the reactant may be supplied through a reactant supply port, and may pass through the catalytic reaction flow path filled with the catalyst such that a catalytic reaction between the reactant and the catalyst occurs, and the unreacted material and the product produced by the reaction may be captured by the product capturing unit, and then discharged through an unreacted material and product discharge port.

In still another preferred embodiment, in the inner heating medium flow zone, the inner heating medium may be supplied through an inner heating medium supply port, and distributed to the inner heating medium inlet tubes by the inner heating medium distributing unit, such that the inner heating medium exchanges heat with the catalytic reaction flow path, and then is discharged to an inner heating medium discharge port through the inner heating medium capturing unit via the inner heating medium discharge tube.

In yet another preferred embodiment, an interior of the catalytic reaction flow path may be filled with a reaction catalyst in the form of an extruded pellet, a sphere, and powder.

In still yet another preferred embodiment, the catalytic reaction flow path may be configured by sequentially stacking at least one catalyst in a longitudinal direction.

In a further preferred embodiment, the same heating medium or different heating media may be used as the shell side heating medium and the inner heating medium.

In another aspect, the present invention provides a shell-and-multi-triple concentric-tube heat exchanger including: a shell side heating medium flow zone in which a shell side heating medium flows along a route formed by a baffle in a shell; a heat exchange zone in which a heat exchange target material is distributed to respective heat exchange flow paths by a heat exchange material distributing unit, and the heat exchange target material includes a completely heat exchanged material capturing unit which captures a completely heat exchanged material produced by a heat exchange between the shell side heating medium and an inner heating medium; and an inner heating medium flow zone in which the inner heating medium is distributed to inner heating medium inlet tubes inserted into the heat exchange flow paths by an inner heating medium distributing unit, and the inner heating medium, which exchanges heat with the heat exchange flow path, is discharged to an inner heating medium capturing unit through inner heating medium discharge tubes, in which one end of the inner heating medium inlet tube inserted into the heat exchange flow path is configured to be closed, the inner heating medium discharge tube includes a configuration that is inserted into the inner heating medium inlet tube and opened, such that the inner heating medium flowing into the inner heating medium inlet tube is discharged through the inner heating medium discharge tube, the shell side heating medium flow zone and the heat exchange zone are separated by a third sealing barrier through which the heat exchange flow paths pass, and the heat exchange material distributing unit and the inner heating medium flow zone are separated by a lower fourth sealing barrier through which the inner heating medium inlet tubes pass so that the inner heating medium and the heat exchange target material are not in contact with each other, and the inner heating medium distributing unit and the inner heating medium capturing unit are separated by an uppermost fourth sealing barrier.

In a preferred embodiment, in the shell side heating medium flow zone, the shell side heating medium may be supplied to a shell side heating medium supply port, may pass through a shell side heating medium flow path, and may exchange heat with the heat exchange flow paths, and then the shell side heating medium may be discharged through a shell side heating medium discharge port.

In another preferred embodiment, in the heat exchange zone, the heat exchange material may be supplied through a heat exchange material supply port, and may pass through the heat exchange flow paths, such that the completely heat exchanged material produced by a heat exchange is captured by the completely heat exchanged material capturing unit, and then discharged through a completely heat exchanged material discharge port.

In still another preferred embodiment, in the inner heating medium flow zone, the inner heating medium is supplied through an inner heating medium supply port, and distributed to the inner heating medium inlet tubes by the inner heating medium distributing unit, such that the inner heating medium exchanges heat with the heat exchange flow paths, and then is discharged through an inner heating medium discharge port via the inner heating medium capturing unit.

In yet another preferred embodiment, the same heating medium or different heating media may be used as the shell side heating medium and the inner heating medium, but the present invention is not limited thereto.

In still yet another preferred embodiment, the reactant gas or the heat exchange medium, which is supplied to the reactor and the heat exchanger, may be supplied in a counter flow method or a co-current flow method, but the present invention is not limited to the supply methods.

The present invention may obtain the following effects through combinations of the aforementioned present exemplary embodiments and configurations to be described below, and a use relationship.

It is possible to easily adjust heat exchange performance of the reactor and the heat exchanger to a desired level by changing heat exchange areas and lengths by adjusting inner diameters of tubes of the shell side heating medium flow path, the reaction flow path, and the inner heating medium inlet tube.

It is also possible to adjust a temperature of a catalyst unit through which reactant gas flows and a temperature of the heat exchange flow path by using the heating medium in the flow path at the shell side, and it is possible to adjust a temperature of the catalyst unit through which reactant gas flows by using the inner heating medium flow path, thereby easily ensuring thermal stability of a catalyst layer produced by the catalytic reaction of the reactant gas by the effective heat exchange between the reactant gas and the heat exchange target material.

It is also possible to uniformly distribute the reactant or the heat exchange target material, increase a flow rate of the reactant or the heat exchange target material, maximize catalyst performance, and improve efficiency of the reactor and the heat exchanger, thereby greatly reducing sizes of the reactor and the heat exchanger.

Reducing sizes of the reactor and the heat exchanger enables simplification and downsizing of XTL processes (GTL, CTL, BTL) for producing clean fuel, GTL-FPSO manufacturing processes, compact reforming devices for a fuel cell, hydrogen stations, petrochemical processes, fine chemical processes, energy processes and the like.

Other aspects and preferred embodiments of the invention are discussed infra.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles, e.g., fuel derived from resources other than petroleum. As referred to herein, a hybrid vehicle is a vehicle that has two or more sources of power, for example, both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
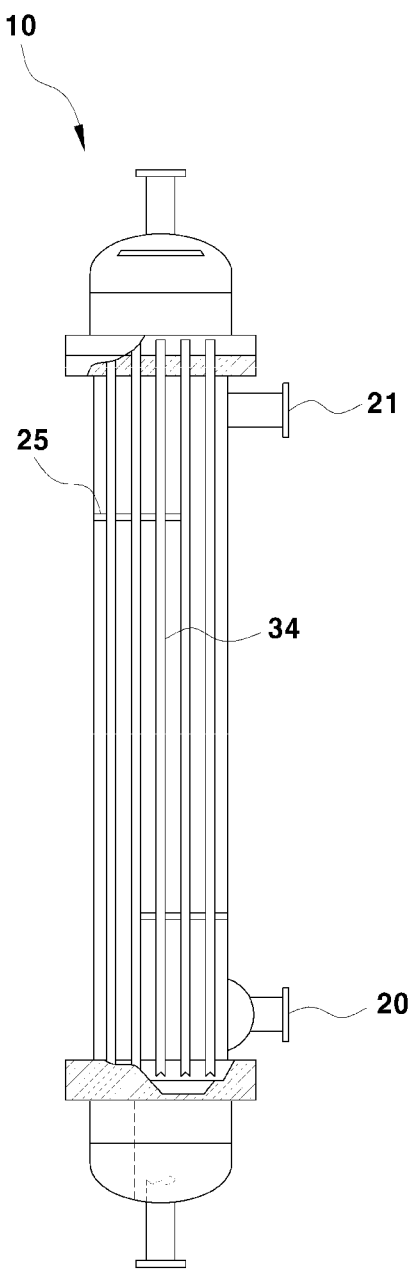
FIG. 1 illustrates a cross-sectional side view of a shell-and-tube reactor in the related art.

Reference numerals set forth in the Drawings include reference to the following elements as further discussed below:

10: reactor
20: shell side heating medium supply port
21: shell side heating medium discharge port
24: shell side heating medium flow path
25: baffle
30: reactant supply port
31: product discharge port
32: reactant distributing unit
33: product capturing unit
34: catalytic reaction flow path
40: inner heating medium supply port
41: inner heating medium discharge port
42: inner heating medium distributing unit
43: inner heating medium capturing unit
44: inner heating medium inlet tube
45: inner heating medium discharge tube
50: upper first sealing barrier
51: uppermost second sealing barrier
60: lower first sealing barrier
61: lower second sealing barrier
100: heat exchanger
120: shell side heating medium supply port
121: shell side heating medium discharge port
124: shell side heating medium flow path
125: baffle
130: heat exchange material supply port
131: completely heat exchanged material discharge port
132: heat exchange material distributing unit
133: completely heat exchanged material capturing unit
134: heat exchange flow path
140: inner heating medium supply port
141: inner heating medium discharge port
142: inner heating medium distributing unit
143: inner heating medium capturing unit
144: inner heating medium inlet tube
145: inner heating medium discharge tube
150: upper third sealing barrier
151: uppermost fourth sealing barrier
160: lower third sealing barrier
161: lower fourth sealing barrier It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in more detail with reference to the accompanying drawings. The exemplary embodiments of the present invention may be modified in various forms, and the scope of the present invention should not be interpreted as being limited to the following exemplary embodiments. The present exemplary embodiments are provided to more completely explain the present invention to a person with ordinary skill in the art.

The term "unit", "port", or the like, which is described in the specification, means a unit that performs at least one function or operation.

In the present specification, names of constituent elements are classified as a first . . . , a second . . . , and the like so as to discriminate the constituent elements having the same name, and the names are not essentially limited to the order in the description below.

The present invention relates to a compact reactor 10 and a compact heat exchanger 100 to which a concept of a shell-and-multi-triple concentric-tube is applied to solve the aforementioned problems in the related art. The present invention relates to the compact reactor 10 and the heat exchanger 100 which may be usefully applied to XTL (GTL, CTL, BTL, etc.) fields such as clean synthetic fuel producing processes, chemical reaction fields required for petrochemical industries, environmental equipment fields, offshore plant fields such as a GTL-FPSO, MeOH-FPSO, DME-FPSO, and cooling and heating systems to which a heat exchanger is applied.

Figure 2:
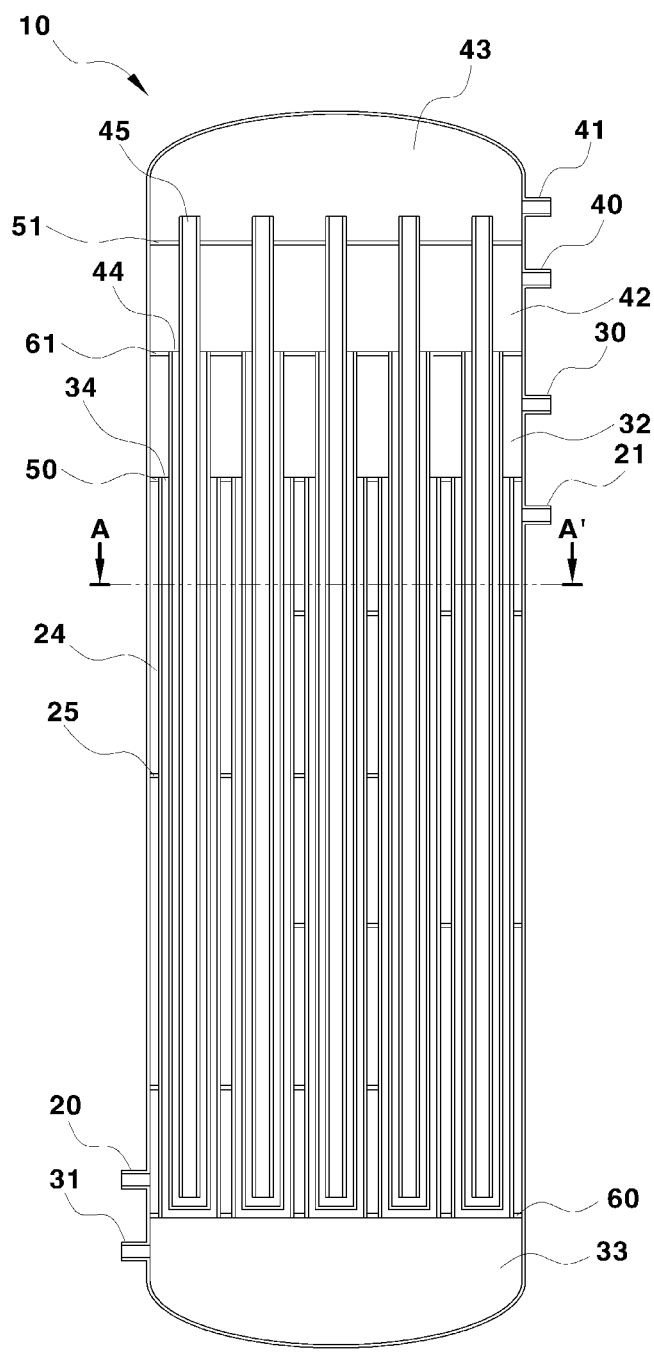
FIG. 2 illustrates a cross-sectional side view of a shell-and-multi-triple concentric-tube reactor according to an exemplary embodiment of the present invention.

FIG. 2 is a cross-sectional side view illustrating a configuration of the shell-and-multi-triple concentric-tube reactor 10 according to the exemplary embodiment of the present invention. As illustrated in FIG. 2, the reactor 10 according to the present invention includes heating medium flow paths through which a heating medium flows to a shell side, catalytic reaction flow paths 34 which are filled with a catalyst and through which a reactant flows, and flow paths through which an inner heating medium flows, and in this case, the respective flow paths are configured such that the heating medium, a reactant supply port 30, and the catalyst are not in contact with one another, and the respective flow paths may be made of metal so as to ensure a sufficient heat exchange. Catalytic reaction flow paths 34, through which the reactant flows, and inner heating medium inlet tubes 44 may be made of metal, and more particularly, include all materials that do not perform a chemical reaction with a shell side heating medium.

In the exemplary embodiment of the present invention, aluminum or copper which has excellent thermal conductivity and machinability, or stainless steel, nickel or cobalt based alloys (inconel, monel, etc.), which has excellent heat resistance and corrosion resistance, may be used as materials of the flow paths that constitute the reactor 10, in order to ensure excellent heat exchange performance and durability and easily form the flow path through which a fluid may flow, but the material of the flow path is not limited to the aforementioned materials.

Since the present invention provides the shell-and-tube reactor 10 that maintains a vertical shape, the reactor 10 includes a configuration in which the shell side heating medium flows in from a shell side heating medium supply port 20 to the shell side of the reactor 10, and the shell side heating medium, which has exchanged heat, is discharged through the shell side heating medium discharge port 21. More particularly, in the exemplary embodiment of the present invention, the shell side heating medium supply port 20 may be positioned at a lower end of the reactor 10, and the shell side heating medium discharge port 21 may be positioned at an upper end of the reactor 10, and the reactor 10 further includes baffles 25 which are positioned on a shell inner surface and constitute the routes of the shell side heating medium movement.

As described above, the shell side heating medium according to the present invention flows in through the shell side heating medium supply port 20 and is discharged through the shell side heating medium discharge port 21 via flow routes formed by the baffles 25 positioned on the shell inner surface, and as a result, the shell side heating medium may pass through the entire region so as to be in contact with a maximum cross-sectional area of the catalytic reaction flow paths 34 positioned in the shell.

As described above, the shell side heating medium, which flows in through the shell side supply port, exchanges heat in a shell side heating medium flow zone which circulates in the shell. The shell side heating medium flow zone, which is configured as described above, is separated by first sealing barriers 50 and 60 respectively positioned at the upper and lower ends of the reactor 10, and with the first sealing barriers 50 and 60, the shell side heating medium discharge port 21 and a reactant distributing unit 32 are separated from the shell side heating medium supply port 20 and a product capturing unit 33. As described above, the reactor 10 includes the shell side heating medium flow zone positioned in an interior where the first sealing barriers 50 and 60, which are respectively positioned at the upper and lower ends of the reactor 10, face each other.

The reactor 10 according to the present invention includes a plurality of catalytic reaction flow paths 34 which is positioned in the shell and through which the reactant passes. The catalytic reaction flow paths 34 may be filled with a catalyst in a longitudinal direction of the flow paths. More particularly, the catalysts, which perform different functions, may be configured to be sequentially stacked in the longitudinal direction of the catalytic reaction flow paths 34, and the amount of catalyst and the number of reactors may vary depending on an aspect or the purpose of the reactor 10 used by a user. In addition, the interior of the catalytic reaction flow path 34 may be filled with at least one reaction catalyst in the form of an extruded pellet, a sphere, and powder.

In addition, instead of a fixed-bed reactor, a slurry bubble column reactor may be provided. In the slurry bubble column reactor, liquid in which a catalyst in the form of powder is mixed with a liquid-state solvent, and reactant gas are simultaneously supplied.

In the case of the catalytic reaction flow paths 34, the reactant is distributed through the reactant distributing unit 32 to the catalytic reaction flow paths 34 filled with the catalyst. Furthermore, the reactant distributing unit 32 is connected with the reactant supply port 30 positioned at the shell side surface. The distributed reactant passes through the catalytic reaction flow paths 34 in the longitudinal direction, and performs a contact reaction with at least one catalyst accommodated in the catalytic reaction flow paths 34. A product produced by the reactant, which performs the catalytic reaction as described above, and an unreacted material, which does not perform a reaction, are captured by the product capturing unit 33 positioned at the lower end of the reactor 10. The captured product or unreacted material may be discharged to the outside of the shell through a product discharge port 31 connected with the product capturing unit 33.

The product capturing unit 33, which is configured as described above, is positioned at the lower end of the reactor 10, and sealed by a lower first sealing barrier 60 positioned at a lower end of the reactor 10 and a lowermost end portion of the reactor 10. Further, the shell side heating medium discharge port 21, which is positioned at the upper end of the reactant distributing unit 32, and the reactant distributing unit 32, which is positioned at the upper side of the shell side heating medium discharge port 21, are separated from each other by the upper first sealing barrier 50, such that the reactant distributing unit 32 is sealed and separated by being positioned between the upper first sealing barrier 50 and a lower second sealing barrier 61. Therefore, a single catalytic reaction zone is formed by including the catalytic reaction flow paths 34, and the reactant distributing unit 32 and the product capturing unit 33 which are positioned at the upper and lower sides of the reactor 10, respectively. The catalytic reaction zone may be positioned at a middle portion of the reactor 10 according to the present invention.

The sealing barriers may be fixedly attached by diffusion bonding, brazing, laser welding, electroplating, TIG welding, pressing, embossing pressing, and the like, and assembled using flanges, in order to prevent a fluid such as the heating medium, the reactant gas, and the product from leaking.

The catalytic reaction flow path 34 is configured to have an annular shape, and includes the inner heating medium inlet tube 44 positioned in the catalytic reaction flow path 34. The exemplary embodiment of the present invention includes the catalytic reaction flow path 34 having an annular shape, and the inner heating medium inlet tube 44 has a smaller diameter than the catalytic reaction flow path 34. The inner heating medium inlet tube 44, which is configured as described above, has the same center as the catalytic reaction flow path 34, protrudes from an upper end of the catalytic reaction flow path 34, and is opened at an upper end of the lower second sealing barrier 61. More particularly, the catalytic reaction flow path 34 is fluidly connected with the inner heating medium distributing unit 42.

The inner heating medium inlet tube 44, which is positioned in the catalytic reaction flow path 34, is configured to have an annular shape, and includes an inner heating medium discharge tube 45 which is inserted into the inner heating medium inlet tube 44 in the longitudinal direction. In addition, the inner heating medium inlet tube 44 has one closed end inserted into the catalytic reaction flow path 34. More particularly, the inner heating medium discharge tube 45, which is configured to have a circular shape and has the same center as the inner heating medium inlet tube 44, has one opened end inserted into the inner heating medium inlet tube 44, such that the heating medium flowing into the inner heating medium inlet tube 44 may flow into the inner heating medium discharge tube 45 through the closed inner heating medium inlet tube 44. In addition, the other end of the inner heating medium discharge tube 45 inserted into the inner heating medium inlet tube 44 protrudes so as to be fluidly connected with an inner heating medium capturing unit 43 positioned at an upper side of an uppermost second sealing barrier 51.

The inner heating medium inlet tube 44 is supplied with the heating medium from an inner heating medium supply port 40, and inserted into the catalytic reaction flow path 34, such that the heating medium, which has exchanged heat in the catalytic reaction flow paths 34, is discharged through an inner heating medium discharge unit. More particularly, the heating medium, which is supplied through the inner heating medium supply port 40, flows in from an inner heating medium distributing unit 42 positioned at an upper end of the reactor 10, and the heating medium positioned in the inner heating medium distributing unit 42 flows into the respective inner heating medium inlet tubes 44. The heating medium, which flows into the respective inner heating medium inlet tubes 44 as described above, may be captured by the inner heating medium capturing unit 43 positioned at an uppermost end of the reactor 10, and then may be discharged through an inner heating medium discharge port 41 positioned at a shell side end.

The exemplary embodiment of the present invention includes a configuration in which the inner heating medium flows into the inner heating medium inlet tubes 44 through the inner heating medium distributing unit 42, and the introduced inner heating medium passes through the inner heating medium discharge tubes 45 inserted into and fluidly connected with the inner heating medium inlet tubes 44, and then is captured by the inner heating medium capturing unit 43 positioned at the uppermost side of the reactor 10.

As described above, the heating medium, which flows in through the inner heating medium inlet tubes 44 positioned in the catalytic reaction flow paths, exchanges heat with the catalytic reaction flow paths, and the inner heating medium distributing unit 42, which is positioned at one opened end of the inner heating medium inlet tube 44 and positioned at the upper end of the reactor 10, and the inner heating medium capturing unit 43, which is positioned at the uppermost end of the reactor 10, are sealed by the uppermost second sealing barrier 51 and the upper end of the reactor 10. As described above, the present invention forms the inner heating medium flow zone that includes all of the configurations for performing a flow of the inner heating medium. The inner heating medium flow zone includes the inner heating medium distributing unit 42 and the inner heating medium capturing unit 43, and is sealed by the uppermost second sealing barrier 51 positioned at the uppermost side of the reactor 10. The uppermost second sealing barrier 51 is positioned between the inner heating medium capturing unit 43 and the reactant distributing unit 32, and prevents the introduced inner heating medium from being mixed with the inner heating medium that has exchanged heat. In addition, the lower second sealing barrier 61 is positioned between the inner heating medium supply port 40 and the reactant distributing unit 32, and may prevent the reactant from being mixed with the introduced inner heating medium.

Figure 3:
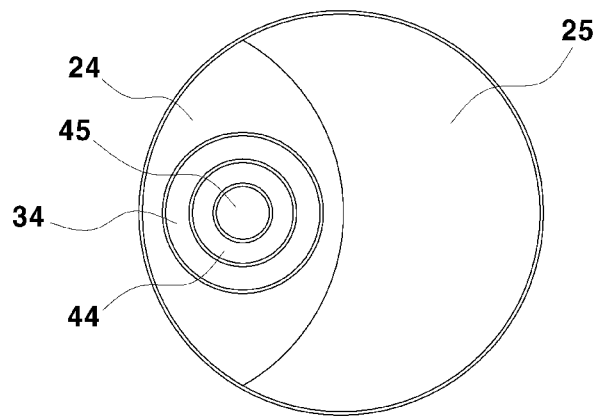
FIG. 3 illustrates a transverse cross-sectional view of the shell-and-multi-triple concentric-tube reactor according to the exemplary embodiment of the present invention.

FIG. 3 is a cross-sectional view illustrating a configuration of the shell-and-multi-triple concentric-tube reactor 10 according to the exemplary embodiment of the present invention.

The cross-sectional view illustrates a cross section taken along line A-A' in FIG. 2, and illustrates the catalytic reaction flow path 34, the inner heating medium inlet tube 44, and the shell side heating medium flow path 24.

The annular catalytic reaction flow path 34 according to the present invention further includes the inner heating medium inlet tube 44 which is positioned in the catalytic reaction flow path 34 having a circular shape and has the same center as the catalytic reaction flow path 34. In addition, the inner heating medium inlet tube 44 includes a closed structure at the lower end of the reactor 10. The inner heating medium inlet tube 44 exchanges heat with the reactant close to a central portion of the catalytic reaction flow path 34, and may cool the reactant positioned on an inner wall surface of the catalytic reaction flow path 34.

The reactor 10 further includes the inner heating medium discharge tube 45 positioned at a central portion of the inner heating medium inlet tube 44, and the inner heating medium discharge tube 45 is inserted into the inner heating medium inlet tube 44 in the longitudinal direction. One end of the inner heating medium discharge tube 45, which is inserted into the inner heating medium inlet tube 44, is opened, such that the inner heating medium discharge tube 45 is fluidly connected with the inner heating medium flowing into the inner heating medium inlet tube 44.

The inner heating medium inlet tube 44 may perform the function of the inner heating medium discharge tube 45, and the inner heating medium discharge tube 45 may perform the function of the inner heating medium inlet tube 44, such that the inner heating medium, which does not exchange heat, may flow in through the inner heating medium capturing unit 43 connected with the inner heating medium discharge tube 45, and the inner heating medium, which has exchanged heat with the catalytic reaction flow path 34, may be discharged to the inner heating medium distributing unit 42 through the inner heating medium inlet tube 44. As described above, in the present invention, the inflow and outflow of the heating medium may be changed depending on an application condition, a structure, and a shape of the reactor 10 or the heat exchanger 100.

In the exemplary embodiment of the present invention, inner diameters of the catalytic reaction flow path 34 and the inner heating medium inlet tube 44 of the reactor 10 may be 10.0 to 150.0 mm, and 10.0 to 50.0 mm, respectively, and more particularly, may be 5.0 to 50.0 mm, and 5.0 to 25.0 mm, respectively. Furthermore, an inner diameter of the inner heating medium discharge tube 45 may be 5 to 9 mm.

The reactor 10 according to the present invention may be generally applied to a configuration that performs an exothermic reaction or an endothermic reaction, and more particularly, the reactor 10 according to the present invention may be applied as a reactor of GTL, GTL-FPSO (floating production storage and offloading), DME-FPSO, and MeOH-FPSO for producing clean fuel such as GTL (gas-to-liquid), CTL (coal-to-liquid), BTL (biomass-to-liquid), DME (dimethyl ether), and MeOH (methanol), a fuel reforming device for a fuel cell, a hydrogen station, a petrochemical process, a fine chemical process, and environmental and energy processes.

Figure 4:
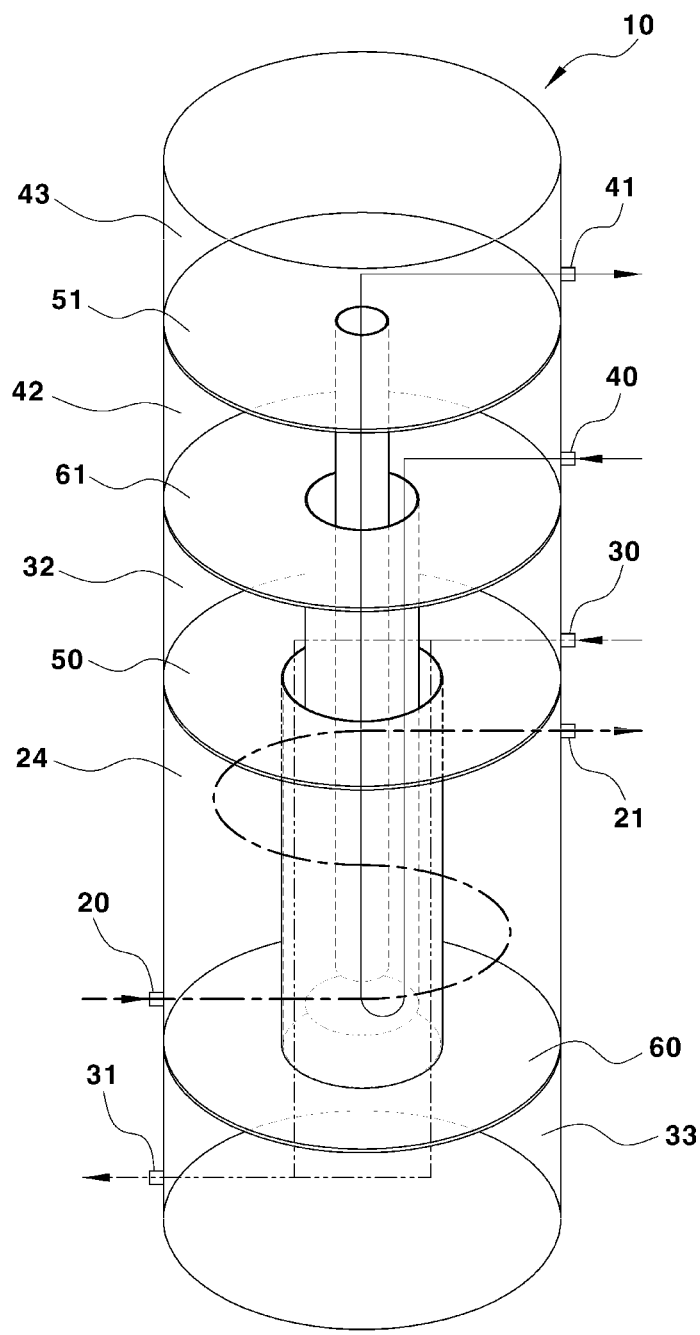
FIG. 4 illustrates a perspective view of a single flow path of the shell-and-multi-triple concentric-tube reactor according to the exemplary embodiment of the present invention.

FIG. 4 illustrates a single flow path of the shell-and-multi-triple concentric-tube reactor 10 according to the exemplary embodiment of the present invention.

The reactant distributing unit 32 and the product capturing unit 33, which are positioned at the upper and lower sides of the catalytic reaction flow path 34 and the reactor 10, respectively, constitute the catalytic reaction zone, and the reactant may flow into the respective catalytic reaction flow paths 34 through the reactant distributing unit 32 positioned at the upper end of the reactor 10. The reactant distributing unit 32 is positioned between the upper first sealing barrier 50 and the lower second sealing barrier 61. Furthermore, the product, which is produced by the catalytic reaction caused by contact with the catalyst in the catalytic reaction flow paths 34, or the unreacted reactant is captured by the product capturing unit 33 positioned at the lower end of the reactor, such that the catalytic reaction zone may be configured to be sealed.

The reactor may include a shell side heating medium flow zone including a sealed zone in an interior where the first sealing barriers 50 and 60 respectively positioned at the upper and lower sides of the reactor 10 face each other. The shell side heating medium flow zone includes the shell side heating medium supply port 20 and the shell side heating medium discharge port 21 which are positioned inside the first sealing barriers 50 and 60, and includes at least one baffle 25 positioned on the shell inner surface.

The exemplary embodiment of the present invention provides a configuration in which the shell side heating medium flows in through the shell side heating medium supply port 20 positioned at an upper end of the lower end first sealing barrier 60, and the introduced shell side heating medium is discharged through the shell side heating medium discharge port 21 positioned at a lower end of the upper end first sealing barrier 50. The reactor includes the shell side heating medium flow zone as described above, such that the heating medium flow route of the heating medium is configured depending on the number and the shape of the baffles 25 positioned in the shell side heating medium flow zone.

The reactor 10 according to the present invention further includes the inner heating medium capturing unit 43 positioned at the upper end of the uppermost second sealing barrier 51, and the inner heating medium distributing unit 42 positioned between the uppermost second sealing barrier 51 and the lower second sealing barrier 61. The inner heating medium may flow into the inner heating medium distributing unit 42 through the inner heating medium supply port 40, and the introduced inner heating medium may flow into the heating medium capturing unit positioned between the upper end of the reactor 10 and the uppermost second sealing barrier 51 through the inner heating medium inlet tubes 44. The inner heating medium, which is captured by the inner heating medium capturing unit 43 as described above, may be discharged to the outside of the shell reactor 10 through the inner heating medium discharge port 41 connected with the inner heating medium capturing unit 43. The inner heating medium flow zone is configured as described above, the inner heating medium is supplied to the inner heating medium inlet tubes 44 positioned in the catalytic reaction flow paths 34 and exchanges heat with a central portion of the reactant, and the inner heating medium, which has exchanged heat, is discharged through the inner heating medium discharge tubes 45 positioned in the inner heating medium inlet tubes 44.

The respective sealing barriers penetrate the catalytic reaction flow paths 34, the inner heating medium inlet tubes 44, and the inner heating medium discharge tubes 45, and form predetermined sealed spaces in the shell.

As a result, the reactor 10 according to the present invention is provided as a reactor 10 with a shell-and-multi-triple concentric-tube concept, in which the heating medium flow paths, through which the shell side heating medium flows, are formed by the baffle 25 in the shell, the catalytic reaction flow paths 34 which are filled with the catalyst and through which the reactant flows are configured in the reactor 10, and the inner heating medium inlet tubes 44 through which the inner heating medium passes are inserted into the catalytic reaction flow paths 34, thereby improving heat exchange performance by exchanging heat using a dual structure in addition to a simple shell-and-tube concept in the related art.

Figure 5A:
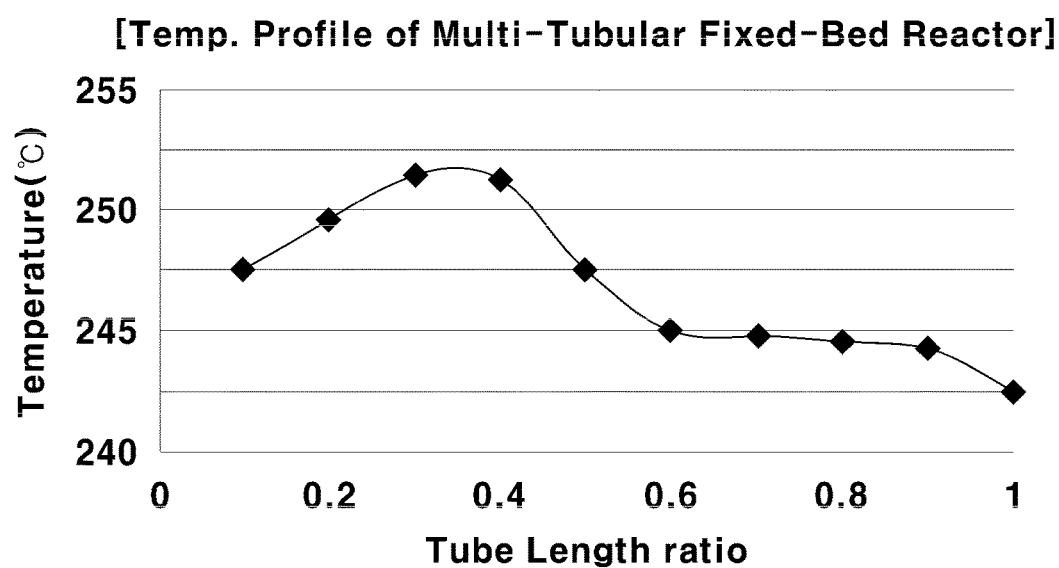
FIG. 5A illustrates a graph illustrating a temperature difference of a catalytic reaction flow path in a longitudinal direction in the related art, which is a Comparative Example with respect to the present invention.

FIG. 5A illustrates a graph illustrating a difference in temperature of the reactant gas in the longitudinal direction of the catalytic reaction flow path 34 of the shell-and-tube reactor 10 in the related art.

That is, FIG. 5A illustrates a difference in temperature, $\Delta T=9K$, of the reactant gas in the longitudinal direction of the catalytic reaction flow path 34 in a case in which a GTL-FPSO (floating production storage and offloading) exothermic reaction is carried out by the shell-and-tube reactor 10 including the catalytic reaction flow path 34 having an inner diameter of 20 mm in the related art.

Figure 5B:
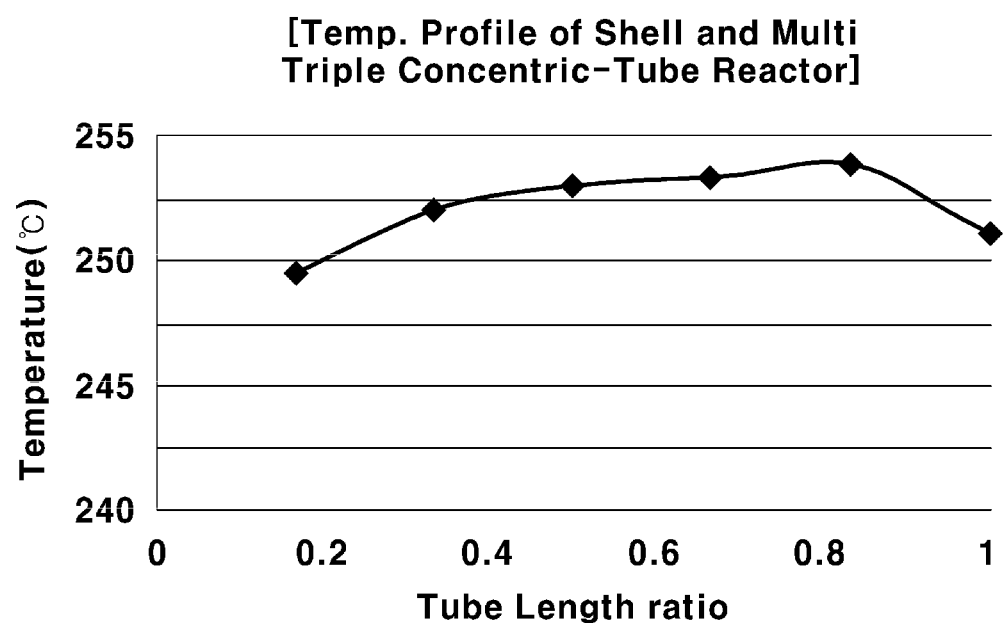
FIG. 5B illustrates a graph illustrating a temperature difference of a catalytic reaction flow path in a longitudinal direction of the shell-and-multi-triple concentric-tube reactor according to the exemplary embodiment of the present invention.

In comparison with FIG. 5A, FIG. 5B illustrates a graph according to measurement of a temperature of the reactant gas in the longitudinal direction of the reactor 10 including the annular catalytic reaction flow path 34 according to the exemplary embodiment of the present invention.

In accordance with the exemplary embodiment of the present invention, the reactor 10 is configured according to a GTL-FPSO (floating production storage and offloading) exothermic reaction, in which inner diameters of the catalytic reaction flow path 34 and the inner heating medium inlet tubes 44 are 20 mm and 10 mm, respectively.

The reactor 10 according to the present invention, which is configured as described above, includes the catalytic reaction flow path 34 which is configured in the longitudinal direction in the shell, such that the reactant gas flows in through the reactant distributing unit 32 at the upper end of the reactor 10, and then flows into the catalytic reaction flow path 34. As described above, the reactant gas comes into contact with the catalyst in the catalytic reaction flow path 34, and moves in the longitudinal direction such that an exothermic reaction of the reactant gas is carried out.

In the exemplary embodiment of the present invention which is configured as described above, a difference in temperature, which occurs in the longitudinal direction of the catalytic reaction flow path 34 by an FTS reaction, which is an exothermic reaction during a GTL-FPSO (floating production storage and offloading) process, is $\Delta T=4.3K$, and it could be seen that it is very easy to control a temperature in the longitudinal direction of the reactor 10, and it is also easy to adjust selectivity of reaction products in accordance with the adjustment of the temperature in comparison with a difference in temperature in the longitudinal direction of the catalytic reaction flow path 34 in the related art.

Figure 6:
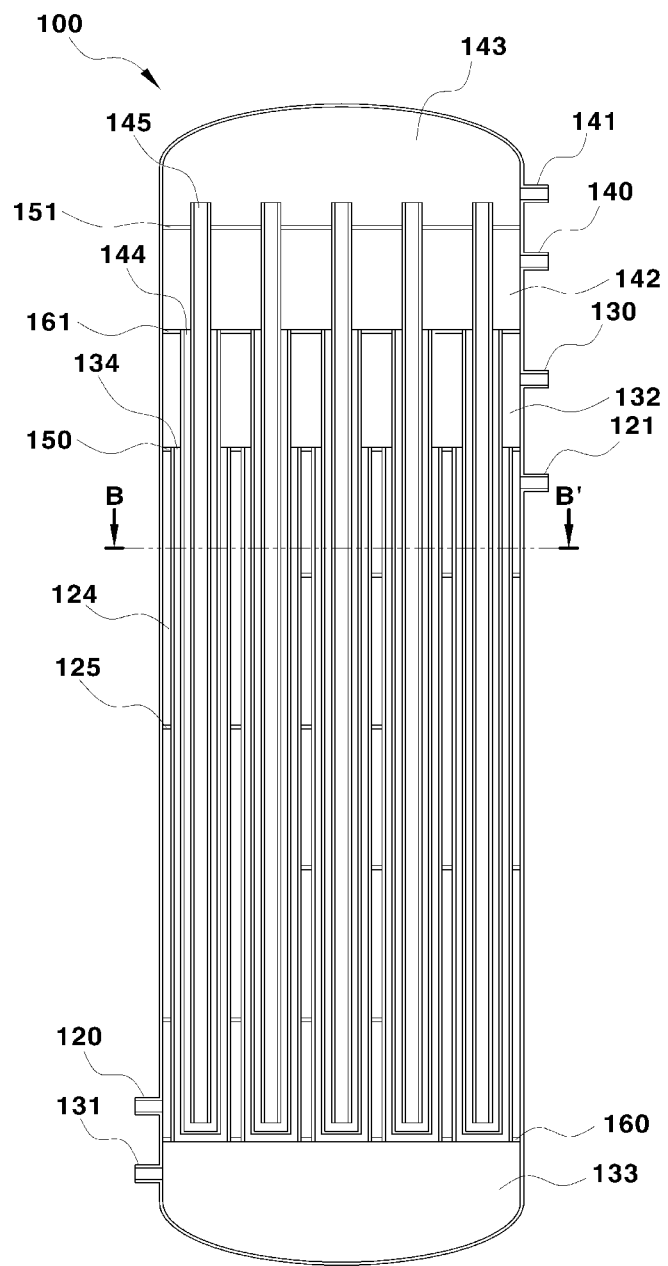
FIG. 6 illustrates a cross-sectional side view of a shell-and-multi-triple concentric-tube heat exchanger according to the exemplary embodiment of the present invention.

FIG. 6 is a cross-sectional side view illustrating a configuration of the shell-and-multi-triple concentric-tube heat exchanger 100 according to the exemplary embodiment of the present invention. As illustrated, the heat exchanger 100 according to the present invention includes heating medium flow paths through which a heating medium flows to a shell side, heat exchange flow paths 134, and flow paths through which an inner heating medium flows, and in this case, the respective flow paths are configured so that the heating medium and the heat exchange target material are not in contact with each other, and the respective flow paths may be made of metal so as to ensure a sufficient heat exchange. The heat exchange flow paths 134, through which the heat exchange target material flows, and inner heating medium inlet tubes 144 may be made of metal, and more particularly, include all materials that do not perform a chemical reaction with a shell side heating medium.

In the exemplary embodiment of the present invention, aluminum or copper which has excellent thermal conductivity and machinability, or stainless steel, nickel or cobalt based alloys (inconel, monel, etc.), which has excellent heat resistance and corrosion resistance, may be used as materials of the flow paths that constitute the heat exchanger 100, in order to ensure excellent heat exchange performance and durability and easily form the flow path through which a fluid may flow, but the material of the flow path is not limited to the aforementioned materials.

Since the present invention provides the shell-and-tube heat exchanger 100 that maintains a vertical shape, the heat exchanger includes a configuration in which the shell side heating medium flows from a shell side heating medium supply port 120 to the shell of the heat exchanger 100, and the shell side heating medium, which has exchanged heat, is discharged through a shell side heating medium discharge port 121. More particularly, in the exemplary embodiment of the present invention, the shell side heating medium supply port 120 may be positioned at a lower end of the heat exchanger 100, and the shell side heating medium discharge port 121 may be positioned at an upper end of the heat exchanger 100, and the heat exchanger 100 further includes baffles 125 which are positioned on a shell inner surface and constitute the routes of the shell side heating medium movement.

As described above, the shell side heating medium according to the present invention flows in through the shell side heating medium supply port 120 and is discharged through the shell side heating medium discharge port 121 via flow routes formed by the baffles 125 positioned on the shell inner surface, and as a result, the shell side heating medium may pass through the entire region so as to be in contact with a maximum cross-sectional area of the heat exchange flow paths 134 positioned in the shell.

As described above, the shell side heating medium, which flows in through the shell side supply port, exchanges heat in a shell side heating medium flow zone which circulates in the shell. The shell side heating medium flow zone, which is configured as described above, is separated by third sealing barriers 150 and 160 respectively positioned at the upper and lower ends of the heat exchanger 100, and with the third sealing barriers 150 and 160, the shell side heating medium discharge port 121 and a heat exchange target material distributing unit are separated from each other, and a shell side heating medium supply port 120 and a completely heat exchanged material capturing unit 133 are separated from each other. As described above, the heat exchanger 100 includes the shell side heating medium flow zone positioned in an interior where the third sealing barriers 150 and 160, which are respectively positioned at the upper and lower ends of the heat exchanger 100, face each other.

The heat exchanger 100 according to the present invention includes the heat exchange flow paths 134 which are positioned in the shell and through which the heat exchange target material passes.

In the case of the heat exchange flow paths 134, the heat exchange target material is distributed to the heat exchange flow paths 134 through a heat exchange material distributing unit 132. The heat exchange target material flows into the heat exchange material distributing unit 132 through a heat exchange material supply port 130 positioned on the shell side surface. The distributed heat exchange target material passes through the heat exchange flow paths 134 in the longitudinal direction. The completely heat exchanged material, which has exchanged heat as described above, is finally captured by the completely heat exchanged material capturing unit 133 positioned at the lower end of the heat exchanger 100. The captured completely heat exchanged material may be discharged to the outside of the shell through a completely heat exchanged material discharge port 131 connected with the completely heat exchanged material capturing unit 133.

The completely heat exchanged material capturing unit 133, which is configured as described above, is positioned at the lower end of the heat exchanger 100, and sealed by the lower third sealing barrier 160, which is positioned at the lower end of the heat exchanger 100, and a lowermost end portion of the heat exchanger 100. Furthermore, the shell side heating medium discharge port 121, which is positioned at the upper end of the heat exchange material distributing unit 132, and the heat exchange material distributing unit 132, which is positioned at the upper side of the shell side heating medium discharge port 121, are separated from each other by the upper third sealing barrier 150, such that the heat exchange material distributing unit 132 is sealed and separated by being positioned between the upper third sealing barrier 150 and a lower fourth sealing barrier 161. Therefore, a single heat exchange zone is formed by including the heat exchange flow paths 134, and the heat exchange material distributing unit 132 and the completely heat exchanged material capturing unit 133 which are positioned at the upper and lower sides of the heat exchanger 100, respectively. The heat exchange zone may be positioned at a middle portion of the heat exchanger 100 according to the present invention.

The sealing barriers may be fixedly attached by diffusion bonding, brazing, laser welding, electroplating, TIG welding, pressing, embossing pressing, and the like, and assembled using flanges, in order to prevent a fluid such as the respective heating media, the heat exchange target material, a heat exchange pigment material from leaking.

The heat exchange flow path 134 is configured to have an annular shape, and includes the inner heating medium inlet tube 144 positioned in the heat exchange flow path 134. The exemplary embodiment of the present invention includes the heat exchange flow path 134 having an annular shape, and the inner heating medium inlet tube 144 has a smaller diameter than the heat exchange flow path 134. The inner heating medium inlet tube 144, which is configured as described above, has the same center as the heat exchange flow path 134, protrudes from an upper end of the heat exchange flow path 134, and is connected with the lower fourth sealing barrier 161 positioned at an upper end of the heat exchange material distributing unit 132. More particularly, the heat exchange flow path 134 is fluidly connected with the inner heating medium distributing unit 142.

The inner heating medium inlet tube 144, which is positioned in the heat exchange flow path 134, is configured to have an annular shape, and includes an inner heating medium discharge tube 145 which is inserted into the inner heating medium inlet tube 144 in the longitudinal direction. In addition, the inner heating medium inlet tube 144 has one closed end inserted into the heat exchange flow path 134. More particularly, the inner heating medium discharge tube 145, which is configured to have a circular shape and has the same center as the inner heating medium inlet tube 144, has one opened end inserted into the inner heating medium inlet tube 144, such that the heating medium flowing into the inner heating medium inlet tube 144 may flow into the inner heating medium discharge tube 145 through the closed inner heating medium inlet tube 144. In addition, the other end of the inner heating medium discharge tube 145 inserted into the inner heating medium inlet tube 144 protrudes so as to be connected with an inner heating medium capturing unit 143 positioned at an upper side of an uppermost fourth sealing barrier 151.

The inner heating medium inlet tube 144 is supplied with the heating medium from an inner heating medium supply port 140, and inserted into the heat exchange flow path 134, such that the heating medium, which has exchanged heat in the heat exchange flow paths 134, is discharged through an inner heating medium discharge unit. More particularly, the heating medium, which is supplied through the inner heating medium supply port 140, flows in from an inner heating medium distributing unit 142 positioned at an upper end of the heat exchanger 100, and the heating medium positioned in the inner heating medium distributing unit 142 flows into the respective inner heating medium inlet tubes 144. The heating medium, which flows into the respective inner heating medium inlet tubes 144 as described above, may be captured by the inner heating medium capturing unit 143 positioned at an uppermost end of the heat exchanger 100, and then may be discharged through an inner heating medium discharge port 141 positioned at a shell side end.

The exemplary embodiment of the present invention includes a configuration in which the inner heating medium flows into the inner heating medium inlet tubes 144 through the inner heating medium distributing unit 142, and the introduced inner heating medium passes through the inner heating medium discharge tubes 145 inserted into and fluidly connected with the inner heating medium inlet tubes 144, and then is captured by the inner heating medium capturing unit 143 positioned at the uppermost side of the heat exchanger 100.

As described above, the heating medium, which flows in through the inner heating medium inlet tubes 144 positioned in the heat exchange flow paths 134, exchanges heat with the heat exchange flow path 134, one opened end of the inner heating medium inlet tube 144 is connected with the inner heating medium distributing unit 142 positioned at the upper end of the heat exchanger 100, and the inner heating medium capturing unit 143, which is positioned at the uppermost end of the heat exchanger 100, is sealed by the uppermost fourth sealing barrier 151 and the upper end of the heat exchanger 100. As described above, the present invention forms the inner heating medium flow zone that includes all of the configurations for performing a flow of the inner heating medium. The inner heating medium flow zone includes the inner heating medium distributing unit 142 and the inner heating medium capturing unit 143, and is sealed by the uppermost fourth sealing barrier 151 positioned at the uppermost side of the heat exchanger 100. The uppermost fourth sealing barrier 151 is positioned between the inner heating medium capturing unit 143 and the heat exchange material distributing unit 132, and prevents the introduced inner heating medium from being mixed with the inner heating medium that has exchanged heat. In addition, the lower fourth sealing barrier 161 is positioned between the inner heating medium supply port 140 and the heat exchange material distributing unit 132, and may prevent the heat exchange target material from being mixed with the introduced inner heating medium.

Figure 7:
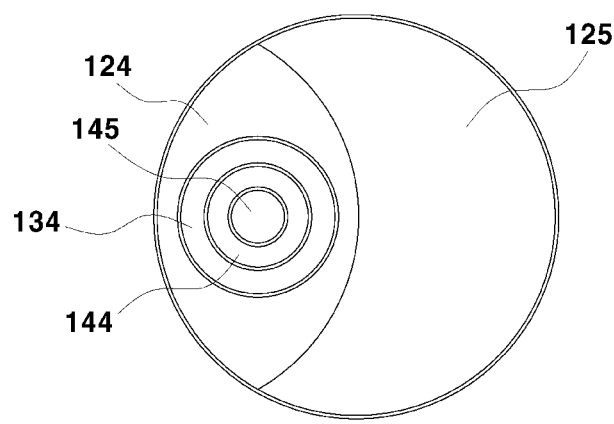
FIG. 7 illustrates a transverse cross-sectional view of the shell-and-multi-triple concentric-tube heat exchanger according to the exemplary embodiment of the present invention.

FIG. 7 is a cross-sectional view illustrating a configuration of the shell-and-multi-triple concentric-tube heat exchanger 100 according to the exemplary embodiment of the present invention.

The cross-sectional view illustrates a cross section taken along line A-A' in FIG. 5, and illustrates the heat exchange flow path 134, the inner heating medium inlet tube 144, and a shell side heating medium flow path 124.

The annular heat exchange flow path 134 according to the present invention further includes the inner heating medium inlet tube 144 which is positioned in the heat exchange flow path 134 having a circular shape and has the same center as the heat exchange flow path 134. In addition, the inner heating medium inlet tube 144 includes a closed structure at the lower end of the heat exchanger 100. The inner heating medium inlet tube 144 exchanges heat with the heat exchange target material close to the central portion of the heat exchange flow path 134, and may cool the heat exchange target material positioned in the heat exchange flow path 134 which does not abut onto the shell side heating medium.

The heat exchanger 100 further includes the inner heating medium discharge tube 145 positioned at a central portion of the inner heating medium inlet tube 144, and the inner heating medium discharge tube 145 is inserted into the inner heating medium inlet tube 144 in the longitudinal direction. One end of the inner heating medium discharge tube 145, which is inserted into the inner heating medium inlet tube 144, is opened, such that the inner heating medium discharge tube 145 is fluidly connected with the inner heating medium flowing into the inner heating medium inlet tube 144.

In the exemplary embodiment of the present invention, inner diameters of the heat exchange flow path 134 and the inner heating medium inlet tube 144 of the heat exchanger 100 may be 10.0 to 150.0 mm, and 10.0 to 50.0 mm, respectively, and more particularly, may be 5.0 to 50.0 mm, and 5.0 to 25.0 mm, respectively. Furthermore, an inner diameter of the inner heating medium discharge tube 145 may be 5 to 10 mm.

The inner heating medium inlet tube 144 may perform the function of the inner heating medium discharge tube 145, and the inner heating medium discharge tube 145 may perform the function of the inner heating medium inlet tube 144, such that the inner heating medium, which does not exchange heat, may flow in through the inner heating medium capturing unit 143 connected with the inner heating medium discharge tube 145, and the inner heating medium, which has exchanged heat with the heat exchange flow path 134, may be discharged to the inner heating medium distributing unit 142 through the inner heating medium inlet tube 144. As described above, in the present invention, the inflow and outflow of the heating medium, may be changed depending on the heat exchanger 100, or an application condition, a structure, and a shape of the heat exchanger 100.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A shell-and-multi-triple concentric-tube reactor comprising:
a shell side heating medium flow zone in which a shell side heating medium flows along a route formed by a plurality of baffles in a shell;
a catalytic reaction zone in which a reactant is distributed to respective catalytic reaction flow paths by a reactant distributing unit, and the reactant performs a catalytic reaction with a catalyst positioned in the catalytic reaction flow paths, the catalytic reaction zone including a product capturing unit which captures a product produced by a heat exchange between the shell side heating medium and an inner heating medium and an unreacted material which is not reacted; and
an inner heating medium flow zone in which the inner heating medium is distributed to inner heating medium inlet tubes inserted into the catalytic reaction flow paths by an inner heating medium distributing unit, and the inner heating medium, which exchanges heat with the catalytic reaction flow paths, is discharged to an inner heating medium capturing unit through inner heating medium discharge tubes, wherein the inner heating medium capturing unit positioned at an uppermost end of the reactor,
wherein one end of the inner heating medium inlet tube inserted into the catalytic reaction flow path is configured to be closed,
the inner heating medium discharge tube includes a configuration that is inserted into the inner heating medium inlet tube and opened, such that the inner heating medium flowing into the inner heating medium inlet tube is discharged through the inner heating medium discharge tube,
the shell side heating medium flow zone and the catalytic reaction zone are separated by a first sealing barrier through which the catalytic reaction flow paths pass,
the reactant distributing unit and the inner heating medium flow zone are separated by a lower second sealing barrier through which the inner heating medium inlet tubes pass so that the inner heating medium and the reactant are not in contact with each other, and
the inner heating medium distributing unit and the inner heating medium capturing unit are separated by an uppermost second sealing barrier, wherein the plurality of the baffles is fixed on the shell,
wherein in the inner heating medium flow zone, the inner heating medium is supplied through an inner heating medium supply port, and is discharged to an inner heating medium discharge port through the inner heating medium capturing unit via the inner heating medium discharge tube, and
wherein the inner heating medium supply port positioned upper than the inner heating medium discharge port.

2. The shell-and-multi-triple concentric-tube reactor of claim 1, wherein in the shell side heating medium flow zone, the shell side heating medium is supplied to a shell side heating medium supply port, passes through a shell side heating medium flow path, and exchanges heat with the catalytic reaction flow path, and then the shell side heating medium is discharged through a shell side heating medium discharge port.

3. The shell-and-multi-triple concentric-tube reactor of claim 1, wherein in the catalytic reaction zone, the reactant is supplied through a reactant supply port, is distributed to the catalytic reaction flow paths filled with the catalyst by the reactant distributing unit, and then passes through the catalytic reaction flow paths such that a catalytic reaction between the reactant and the catalyst occurs, and the unreacted material and the product produced by the reaction are captured by the product capturing unit, and then discharged through an unreacted material and product discharge port.

4. The shell-and-multi-triple concentric-tube reactor of claim 1, wherein in the inner heating medium flow zone, the inner heating medium is distributed to the inner heating medium inlet tubes by the inner heating medium distributing unit, such that the inner heating medium exchanges heat with the catalytic reaction flow path.

5. The shell-and-multi-triple concentric-tube reactor of claim 1, wherein an interior of the catalytic reaction flow path is filled with a reaction catalyst in the form of an extruded pellet, a sphere, and powder.

6. The shell-and-multi-triple concentric-tube reactor of claim 1, wherein the catalytic reaction flow path is configured by sequentially stacking at least one catalyst in a longitudinal direction.

7. The shell-and-multi-triple concentric-tube reactor of claim 1, wherein the shell side heating medium and the inner heating medium are configured by the same heating medium or different heating media, and one or more heating media selected from water, working fluid, and solvent is used as the heating media.

8. The shell-and-multi-triple concentric-tube reactor of claim 1, wherein a counter flow method and a co-current flow method are applicable to the reactor depending on a supply method, and the supply method is not limited thereto.

9. The shell-and-multi-triple concentric-tube reactor of claim 1, wherein, the reactor is the type of a fixed-bed reactor or a slurry bubble column reactor which is provided depending on a method to fill the catalytic reaction flow paths with the catalyst and a method to provide reactant gas, and the type of a reactor is not limited thereto.

10. A shell-and-multi-triple concentric-tube heat exchanger comprising:
a shell side heating medium flow zone in which a shell side heating medium flows along a route formed by a plurality of baffles in a shell;
a heat exchange zone in which a heat exchange target material is distributed to respective heat exchange flow paths by a heat exchange material distributing unit, and a completely heat exchanged material capturing unit capturing a completely heat exchanged material produced by heat exchange between the heat exchange target material and the shell side heating medium and an inner heating medium, is included; and
an inner heating medium flow zone in which the inner heating medium is distributed to inner heating medium inlet tubes inserted into the heat exchange flow paths by an inner heating medium distributing unit, and the inner heating medium, which exchanges heat with the heat exchange flow path, is discharged to an inner heating medium capturing unit through inner heating medium discharge tubes, wherein the inner heating medium capturing unit positioned at an uppermost end of the heat exchanger,
wherein one end of the inner heating medium inlet tube inserted into the heat exchange flow path is configured to be closed,
wherein the inner heating medium discharge tube includes a configuration that is inserted into the inner heating medium inlet tube and opened, such that the inner heating medium flowing into the inner heating medium inlet tube is discharged through the inner heating medium discharge tube, wherein the shell side heating medium flow zone and the heat exchange zone are separated by a third sealing barrier through which the heat exchange flow paths pass, wherein the heat exchange material distributing unit and the inner heating medium flow zone are separated by a lower fourth sealing barrier through which the inner heating medium inlet tubes pass so that the inner heating medium and the heat exchange target material are not in contact with each other, wherein the inner heating medium distributing unit and the inner heating medium capturing unit are separated by an uppermost fourth sealing barrier, wherein in the inner heating medium flow zone, the inner heating medium is supplied through an inner heating medium supply port and is discharged through an inner heating medium discharge port via the inner heating medium capturing unit, and wherein the inner heating medium supply port positioned upper than the inner heating medium discharge port.

11. The shell-and-multi-triple concentric-tube heat exchanger of claim 10, wherein in the shell side heating medium flow zone, the shell side heating medium is supplied to a shell side heating medium supply port, passes through a shell side heating medium flow path, and exchanges heat with the heat exchange flow path, and then the shell side heating medium is discharged through a shell side heating medium discharge port.

12. The shell-and-multi-triple concentric-tube heat exchanger of claim 10, wherein in the heat exchange zone, the heat exchange material is supplied through a heat exchange material supply port, is distributed to the heat exchange flow paths by the heat exchange material distributing unit, and then passes through the heat exchange flow paths, such that the completely heat exchanged material produced by a heat exchange is captured by the completely heat exchanged material capturing unit, and then discharged through a completely heat exchanged material discharge port.

13. The shell-and-multi-triple concentric-tube heat exchanger of claim 10, wherein in the inner heating medium flow zone, the inner heating medium is distributed to the inner heating medium inlet tubes by the inner heating medium distributing unit, such that the inner heating medium exchanges heat with the heat exchange flow paths.

14. The shell-and-multi-triple concentric-tube heat exchanger of claim 10, wherein the shell side heating medium and the inner heating medium are configured by the same heating medium.

15. The shell-and-multi-triple concentric-tube heat exchanger of claim 10, wherein a counter flow method and a co-current flow method are applicable depending on a supply method of the heat exchanger, and the supply method is not limited thereto.

* * * * *